United States Patent [19]

Bott

[11] Patent Number: 5,035,184
[45] Date of Patent: Jul. 30, 1991

[54] CARGO RESTRAINT SYSTEM

[76] Inventor: John A. Bott, 931 Lakeshore Dr., Grosse Pointe Shores, Mich. 48236

[21] Appl. No.: 496,115

[22] Filed: Mar. 19, 1990

Related U.S. Application Data

[63] Continuation of Ser. No. 251,033, Sep. 26, 1988, abandoned, which is a continuation of Ser. No. 21,778, Mar. 4, 1987, abandoned.

[51] Int. Cl.$^5$ .............................................. B60P 7/135
[52] U.S. Cl. ..................................... 104/121; 410/130
[58] Field of Search ............... 410/135, 130, 129, 132, 410/133, 139, 121, 140, 118; 108/10, 137, 129, 132; 211/85, 162, 195; 224/42.42, 273, 311, 326; 248/297.2, 298; 296/37.5, 37.16

[56] References Cited

U.S. PATENT DOCUMENTS

| | | |
|---|---|---|
| Re. 28,788 | 4/1976 | Williamson, III . |
| 907,171 | 12/1908 | Poles et al. .................. 211/195 X |
| 1,136,005 | 4/1915 | Gumbel ..................... 248/297.2 |
| 1,499,229 | 6/1924 | Laffey . |
| 1,875,772 | 9/1932 | Strathaus . |
| 2,388,304 | 11/1945 | Ackerman et al. . |
| 2,518,342 | 8/1950 | Lim . |
| 2,808,788 | 10/1957 | Stough . |
| 2,986,315 | 5/1961 | Zimmerman . |
| 3,017,842 | 1/1962 | Nampa ..................... 410/135 X |
| 3,164,395 | 1/1965 | Burch et al. . |
| 3,193,122 | 7/1965 | Sauthoff . |
| 3,203,363 | 8/1965 | Miller . |
| 3,229,994 | 1/1966 | Klein . |
| 3,428,330 | 2/1969 | Klein . |
| 3,446,526 | 5/1969 | Peters . |
| 3,620,171 | 11/1971 | Brenia et al. . |
| 3,643,973 | 2/1972 | Bott . |
| 3,779,174 | 12/1973 | Doyle et al. . |
| 3,845,601 | 11/1974 | Kostecky . |
| 4,029,244 | 6/1977 | Roberts . |
| 4,049,311 | 9/1977 | Districh et al. . |
| 4,181,349 | 6/1980 | Nix et al. . |
| 4,185,799 | 1/1980 | Richards, Jr. . |
| 4,200,046 | 4/1980 | Koliba et al. . |
| 4,226,348 | 10/1980 | Dottor et al. . |
| 4,278,376 | 7/1981 | Hunter . |
| 4,341,412 | 7/1982 | Wayne . |
| 4,500,020 | 2/1985 | Rasor . |
| 4,507,033 | 3/1985 | Boyd ............................. 410/104 |
| 4,536,025 | 8/1985 | Yamawaki et al. . |
| 4,540,213 | 9/1985 | Herlitz et al. . |
| 4,592,530 | 6/1986 | Seely et al. ................. 248/298 X |

FOREIGN PATENT DOCUMENTS

| | | |
|---|---|---|
| 540442 | 5/1957 | Canada . |
| 0540442 | 5/1957 | Canada ......................... 410/121 |
| 3332695 | 3/1985 | Fed. Rep. of Germany ... 296/37.16 |
| 1161214 | 10/1956 | France . |
| 2395861 | 1/1978 | France . |
| 1588292 | 4/1981 | United Kingdom . |

*Primary Examiner*—Russell D. Stormer
*Assistant Examiner*—Gary C. Hoge
*Attorney, Agent, or Firm*—Harness, Dickey & Pierce

[57] ABSTRACT

A cargo restraint system for vehicles is disclosed. The cargo restraining device includes a mechanism secured to a vehicle surface to enable selectable positioning of the cargo restraint system. Also, a member for restraining cargo on the vehicle surface is associated with the selectable positioning mechanism secured to the vehicle surface. The restraining member is movable from a first position, substantially parallel with and adjacent to the vehicle surface, to a second operable position. In the operable second position, the restraining member is substantially orthogonal to the vehicle surface.

15 Claims, 3 Drawing Sheets

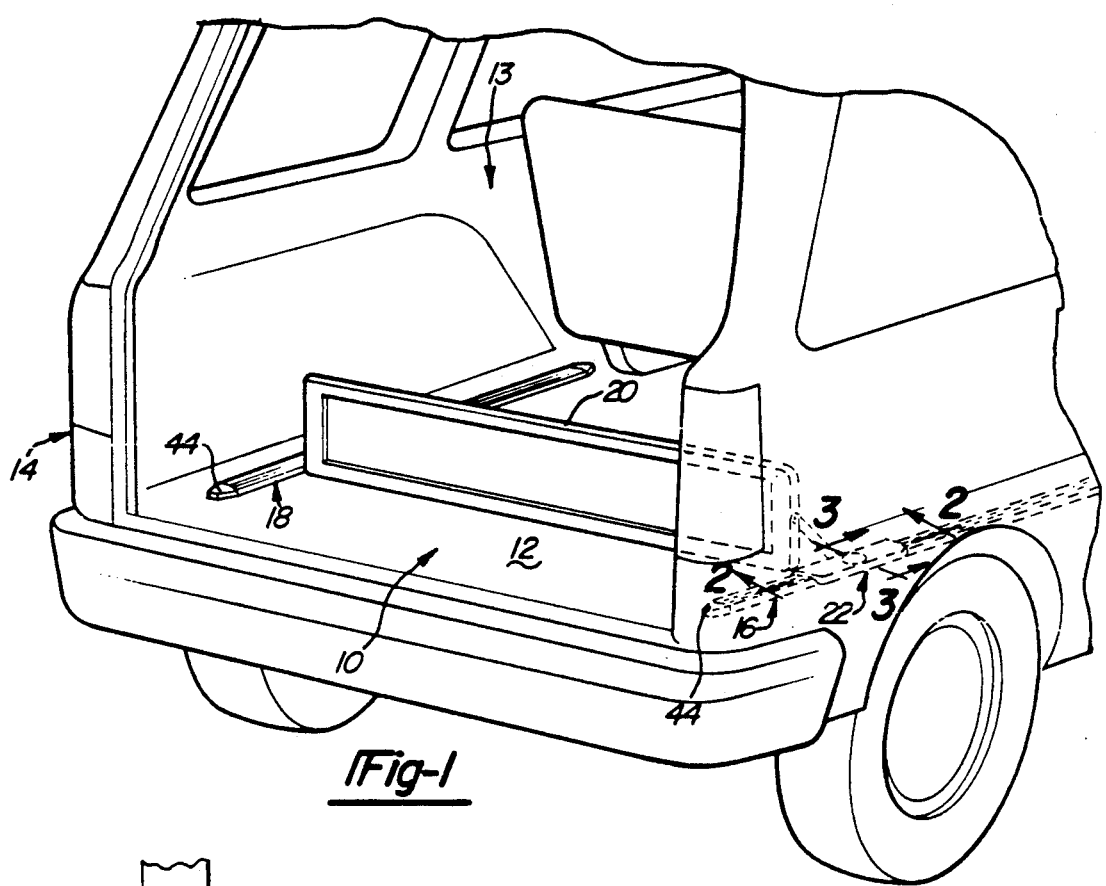
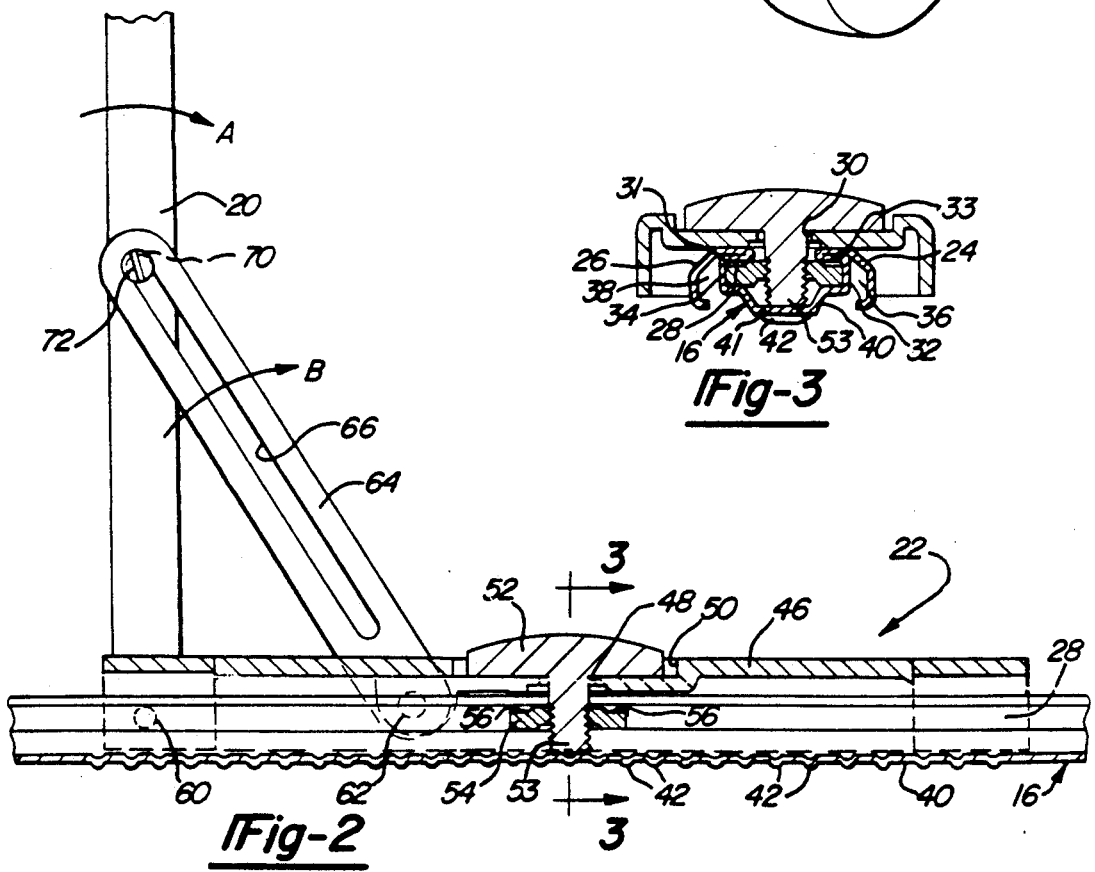

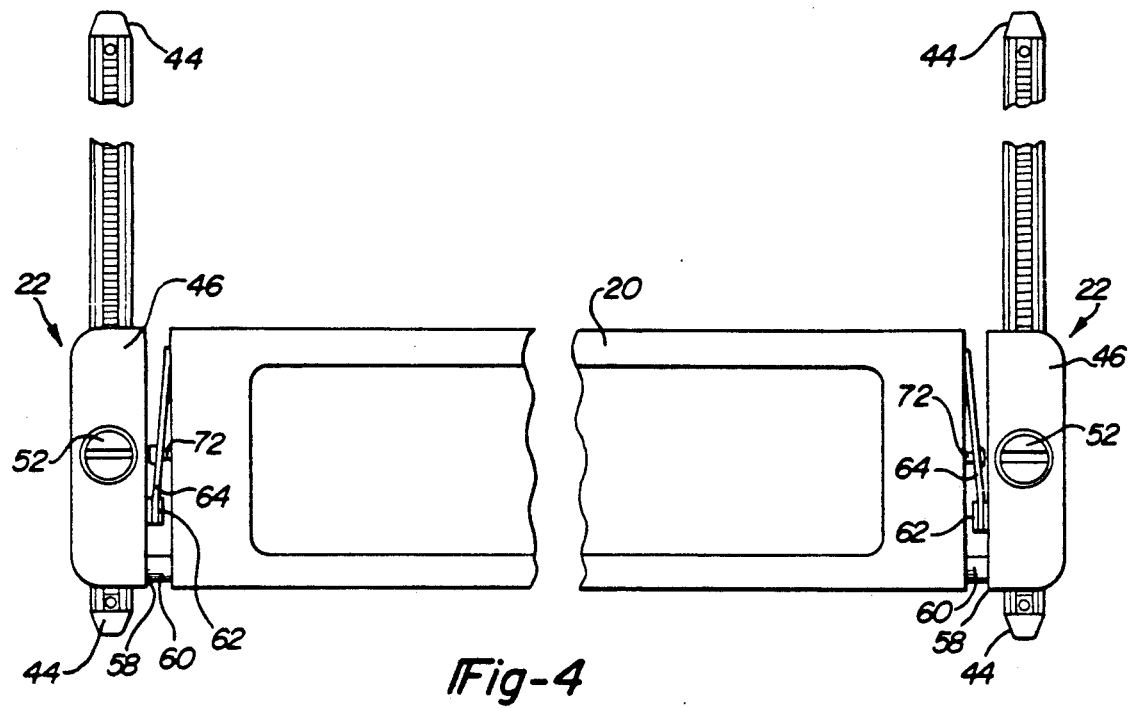
_Fig-4_
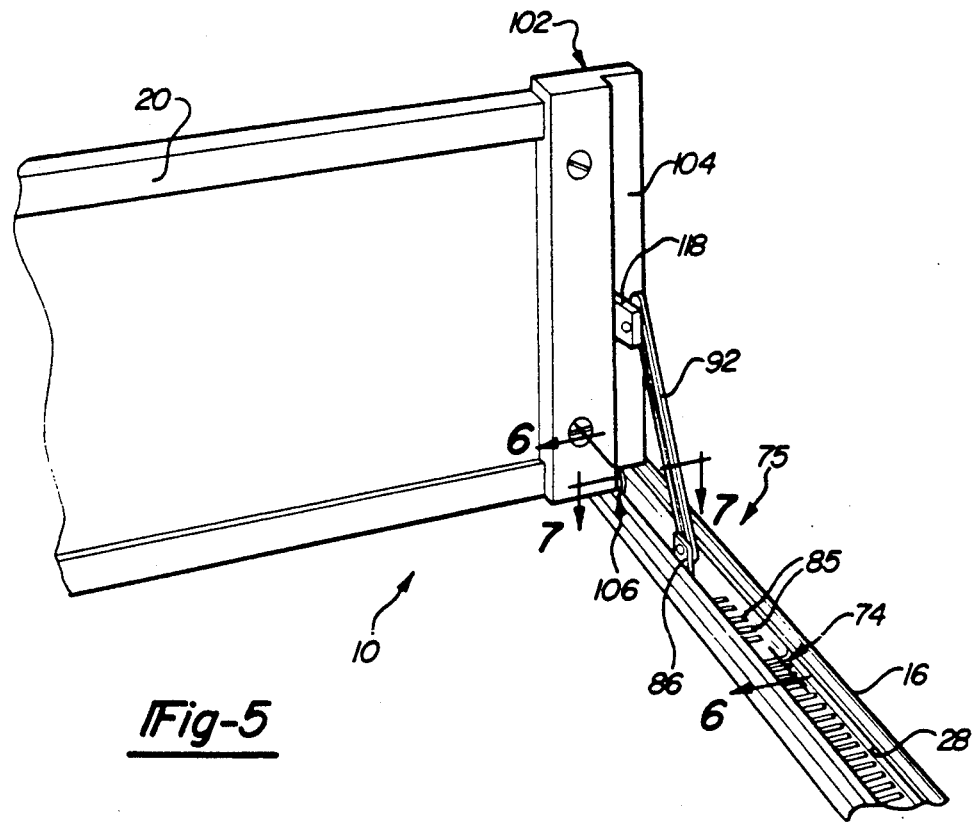
_Fig-5_

CARGO RESTRAINT SYSTEM

This is a continuation of U.S. patent application Ser. No. 07/251,033, filed Sept. 26, 1988, entitled CARGO RESTRAINT SYSTEM, which is a continuation of Ser. No. 07/021,778, filed Mar. 4, 1987, both abandoned.

BACKGROUND AND SUMMARY OF THE INVENTION

The present invention relates to vehicles and, more particularly, to cargo restraint systems positioned on a vehicle surface.

As vans and mini vans become more predominant in society, a need arises to stabilize cargo positioned in the rear of these vehicles. Even in station wagons and conventional vehicle trunks, a device is needed for stabilizing and restraining cargo positioned in these vehicles. Thus, there is a need in the field for a cargo restraint which prevents groceries, or the like, from sliding around in the open rear cargo area of a vehicle. A desired cargo restraint system should be selectively positionable in an operable position, enabling restraint of groceries, cargo, or the like, to a non-operable position where the cargo restraining system is out of the way, enabling other uses of the open rear cargo area. Thus, there is a need in the field for a cargo restraining system which meets these desired characteristics.

Accordingly, the present invention meets the needs of the above described cargo system. The present invention provides the art with a cargo restraint system which is selectively movable from an operable position to an out of the way non-operable position. The present invention provides a vehicle with a cargo restraint device which divides the cargo area into desired partitions. The present invention provides the art with an easily installed cargo restraint system that is both practical and economical in use.

The present invention provides the art with a new cargo restraint system. The present invention includes a mechanism secured to a vehicle surface for enabling selectable positioning of the cargo restraint system. A member for restraining cargo on the vehicle surface is with the mechanism secured to the vehicle surface. The member for restraining cargo is movable from a first non-operable position, substantially parallel and adjacent to the vehicle surface, to a second operable position. In the operable position, the restraint member is substantially perpendicular to the vehicle surface for restraining cargo.

The mechanism for enabling selectable positioning of the cargo restraint system generally includes one or more track members secured to the surface of the vehicle. Also, a slider member is associated with each of the track members. The slider members selectively position the cargo restraint along the track members for dividing the cargo area.

From the subsequent description and appended claims taken in conjunction with the accompanying drawings, other objects and advantages of the present invention will become apparent to one skilled in the art.

BRIEF DESCRIPTION OF THE DRAWINGS

FIG. 1 is a perspective view of a cargo restraint system in accordance with the present invention.

FIG. 2 is a partial cross-section view of FIG. 1 along line 2—2 thereof.

FIG. 3 is a cross-section view of FIG. 1 along line 3—3 thereof.

FIG. 4 is a plan view of FIG. 1 in a non-use position.

FIG. 5 is a partial perspective view of another embodiment of a cargo restraint system in accordance with the present invention.

DETAILED DESCRIPTION OF THE PREFERRED EMBODIMENT

Figure 6:
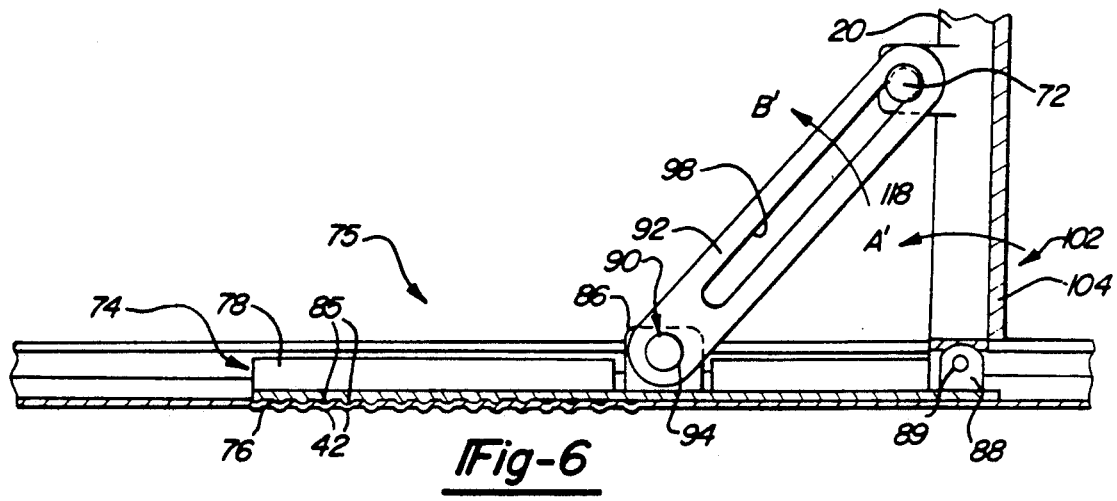
FIG. 6 is a partial cross-section view of FIG. 5 along line 6—6 thereof.

Referring to the figures, a cargo restraint system is illustrated and designated with the reference numeral 10. Generally, the cargo restraint system is positioned in the cargo area 13 of a vehicle 14. The cargo restraint system 10 generally includes a pair of track members 16 and 18 secured to the vehicle surface 12 to enable selectable positioning of a beam member 20 of the cargo restraint system 10. The beam member 20 is associated with the track members 16 and 18 by slider mechanisms 22. The beam member 20 enables groceries, cargo, or the like, to be retained in a selected desired position on either side of the beam member 20. Preferably, the groceries, cargo, or the like, are supported by the beam member 20 on either side of the beam member 20 such that the seat or hatchback lid, supports the other side of the groceries, cargo, or the like. The beam member 20 is shown in FIG. 1 in its operable position extending substantially orthogonal or perpendicular to the vehicle surface 12.

The tracks 16 and 18 are elongated, longitudinally extending and laterally spaced by a distance sufficient to receive beam member 20 therebetween, each track being integrally formed into a generally rectangular cross-section whereby to define a channel 28 having an interior. Each track member includes a sunken bottom portion 40 having a horizontal bottom wall 41, a pair of vertical sides 32 and 34, a pair of horizontal top walls 31 and 33 which are laterally spaced to define a longitudinally extending central opening 30 that communicates with the interior of channel 28, and a pair of skirt flanges 24 and 26 each extending laterally from central opening 30 as continuations of walls 31 and 33. The sunken bottom portion 40 is adapted to be secured to the vehicle surface by conventional means, such as by bolts, and includes a longitudinal succession of depressions 42 each extending vertically from bottom wall 41 and each adapted to be engaged by the free end 53 of a fastener 52 inserted through opening 30. The depressions enable the slider mechanism 22 to be secured relative to the track whereby to selectively position beam member 20 relative to the vehicle surface. The depressions 42 act as detents to enable the sliding mechanisms to ratchet along in the track channel 28. Also, an end cap 44 may be positioned in the channel 28 for retaining the slider mechanism within the track channel 28.

Each skirt flange 24 and 26 includes a first portion that extends laterally from the opening 30, a second portion that bends downwardly so as to be spaced from but be generally parallel to laterally spaced vertical sides 32 and 34, and a third portion that extends inwardly toward the bottom wall 41 of bottom portion 40. The third portions are generally parallel to both top wall 31 and 33 and the bottom wall 41, each third portion for engaging the vehicle surface to inhibit lateral sway of the track. Gaps 36 and 38 are formed between respective side walls 32 and 34 and flanges 24 and 26.

Turning to FIG. 2, a slider mechanism 22, shown in cross-section, is positioned on a track member. The slider mechanism 22 includes a base 46 having an overall rectangular shape with curved ends. An aperture 48 and counter sink 50 are formed in the base 46. The aperture 48 and counter sink 50 enable a securement or fastener member 52 to pass through the aperture 48 and seat in the counter sink 50. The fastener member 52 is associated with a tap plate 54 positioned within the track channel 28. As the fastener member 52 is tightened in the tap plate 54, the tap plate 54, having projections 56, contacts the inside top surface of the track members. This contacting locks the tap plate 54 against the track top surface and secures the slider mechanism 22 in a desired position along the track members 16 and 18. The base 46 has a recess 58 for enabling a pin 60, associated with the beam member 20, to seat in the recess 58. The beam member 20, via the pin 60, is rotatably secured in the base recess. A second pin 62, secured in the base member 46, enables a bracket 64 to be associated with the base 46. The bracket 64 is also associated with the beam member 20.

The bracket 64 has an overall elongated rectangular shape and a slot 66 substantially through the bracket 64. The bracket 64 also has an aperture (not shown) for enabling the bracket 64 to be pivotally secured to the base 46 by pin 62. The slot 66 has an enlarged circular portion 70 at the end furthest away from the aperture. The circular portion 70 enables a pin 72, secured to the beam member 20, to become locked in the bracket 64 when the beam member 20 is placed in its operable position perpendicular to the vehicle surface 12. Shown best with reference to FIG. 4, bracket 64 is formed to have its opposite end portions angled (i.e., defining noncoplanar ends), the pin 62 fixes one end portion of bracket 64 for rotation relative to base 46, and the pin 72 fixes the other end portion of bracket 64 for movement relative to slot 66 and causes this bracket end portion to constantly bear against the side of beam member 20 as member 20 rotates from its downward position (FIG. 4, where the beam is parallel to the vehicle surface, or rotates to its upward position (FIG. 2, where the beam is perpendicular to the vehicle surface).

The beam member 20 has an overall rectangular shape and is associated with the slider bases 46 via pins 60. The beam member 20 is generally a relatively flat planar member possibly having depressions therein for enhancing manufacturing of the base member 20. The beam member may be manufactured from plastic, wood, metallic material, or a combination thereof. The beam member 20 is manufactured by conventional means.

Moving to FIG. 5, a second embodiment of the present invention is shown. The elements which are substantially similar to the elements of the first embodiment will be numbered with the same reference numeral. The difference between the embodiments will be pointed out.

The cargo restraint system 10 includes track members 16 and 18 which are substantially the same as those in the first embodiment. Also, the beam member 20 is substantially the same as that in the first embodiment. The slider mechanisms 75 of the second embodiment differs from the slider mechanism 22 of the first embodiment.

Figure 7:
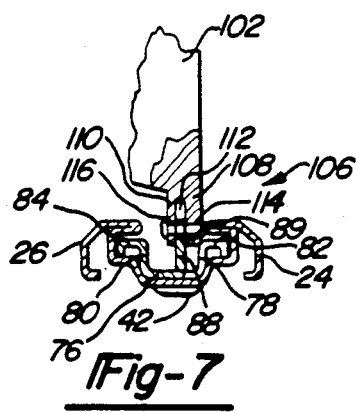
FIG. 7 is a cross-section view of FIG. 5 along line 7—7 thereof.

The slider mechanisms 75 includes a frame member 74 positioned within the track channel 28. The frame member 74 includes a bottom 76 having a pair of extending side walls 78 and 80 as seen in FIG. 7. A pair of flanges 82 and 84 extend from the side walls 78 and 80 substantially parallel to the bottom 76. Thus in cross section, the frame member 74 has a U-shaped cross-section appearance with the flanges 82 and 84 extending perpendicular to the free ends of the "U" as seen in FIG. 7. The bottom 76 has one or more nubs 85 extending therefrom. The nubs 85 nest in the track depressions 42 to secure the frame 74 in a selected position along the track members 16 and 18. The frame member 74 also includes extending members 86 and 88 to secure bracket 92 and the beam member 20, respectively, onto the frame member 74.

Projecting member 86 is spaced between side walls 78 and 80 and extends substantially perpendicular to the frame bottom 76. Projection member 86 has an aperture 90 to enable passage of a rivet, or the like, to secure the bracket 92 onto the frame member 74. The bracket 92 is substantially the same as bracket 64 but varies in some aspects, as will be pointed out herein.

The bracket 92 is generally flat and has opposite end portions which are slightly angled relative to one another so as to be disposed in different planes much as described with bracket 64 so as to provide the bracket 92 with resilient spring characteristics. The bracket 92 has an aperture 94 to pivotally secure one end of bracket 92 by conventional means, such as by a rivet or the like, to the projecting member 86 and a longitudinal slot 98 running substantially through the entire bracket 92. The slot 98 has an enlarged circular portion 100 at one of its ends. The slot circular portion 100 enables the bracket 92 to lock the beam pin 72 in the bracket 92 when the beam member 20 is in its operable position.

Figure 8:
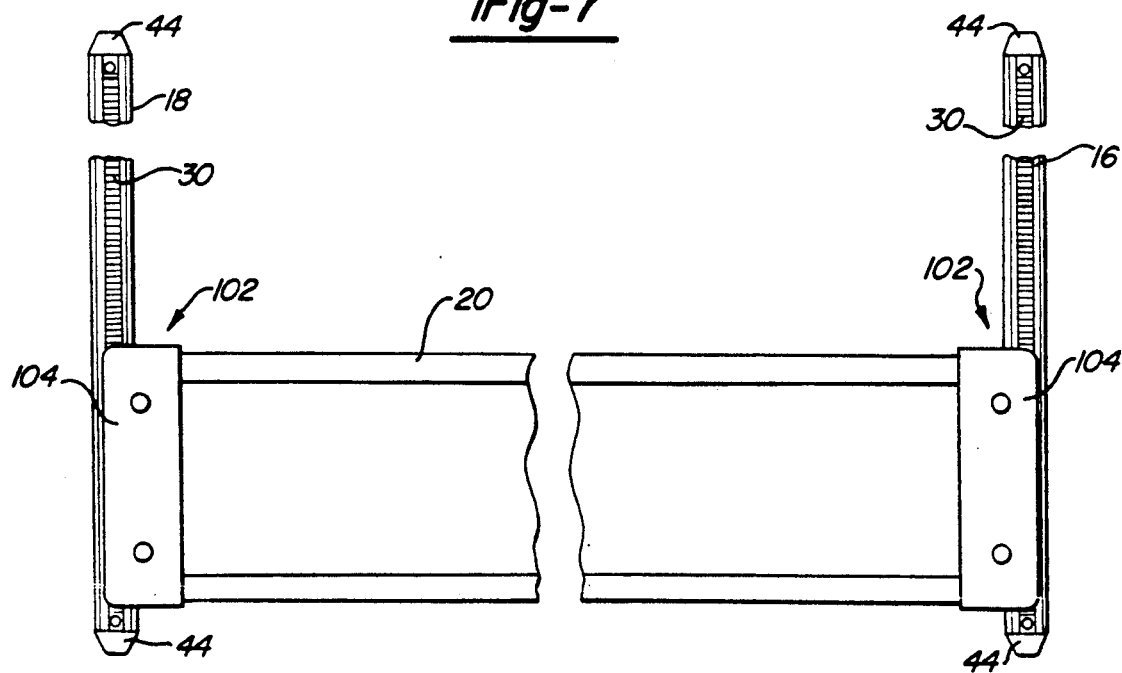
FIG. 8 is a plan view of FIG. 5 in a non-use position.

Beam member 20 has end caps 102 secured to the ends of the beam member 20. The end caps 102 have a projecting flange 104 extending parallel with and away from the beam member 20. The flange 104 covers the track opening 30 when the beam member 20 is in its nonoperable position, as shown in FIG. 8. The flange 104 has a member 106 to connect the end cap 102 to the frame member projection 88. Member 106 includes a pair of walls 108 and 110 having a slot 112 between the walls 108 and 110, as seen in FIG. 7. The walls 108 and 110 have apertures 114 and 116 therethrough corresponding with aperture 89 in projecting member 88. A fastener, such as a rivet or the like, is passed through apertures 114, 89, and 116, to secure the end cap 102 and the beam member 20 onto the slider frame member 74.

The end cap 102 also has an extending bracket 118 to secure beam pin 72 onto the end cap 102. The pin 72 is secured to the bracket portion 118 of the end cap 102. The pin 72 enables pivotal movement of the beam member 20 from its non-operable position, adjacent to the vehicle surface 12, to its operable position substantially perpendicular to the vehicle surface 12. When the beam member 20 is in its non-operable position, as shown in FIG. 8, the bracket 118 is positioned through opening 30 in the track channel 28. Also, the flange 104 covers the brackets 92 and 118 to provide the cargo restraint assembly with hidden hardware in its non-operable position.

While the above summarizes the present invention, it will become apparent to one skilled in the art that modifications, variations, and alterations may be made to the present invention without deviating from the scope and fair meaning of the subjoined claims.

What is claimed is:

1. A cargo restraint for a vehicle comprising: positioning means adapted to be fixedly secured to a vehicle surface for enabling selectable, slidable positioning of said cargo restraint above said surface; and a planar wall member for restraining movement of cargo on said vehicle surface, said wall member having a pair of opposite lateral edges and being movable from a retracted, nonrestraining, first position wherein the wall is substantially parallel to the vehicle surface and adjacent said positioning means to a restraining second position wherein said wall is substantially perpendicular to the vehicle surface for restraining cargo movement; and slider means disengageably associated with said positioning means, said slider means including a resilient bracket pivotally connected to each of said lateral edges of said wall member and said slider means and disposed for movement in a plane substantially perpendicular to said wall member, said bracket including means to allow said wall member to pivot toward said slider means for said first position.

2. The cargo restraint according to claim 1 wherein said positioning means for enabling selectable positioning includes one or more track members secured to said vehicle surface.

3. The cargo restraint according to claim 2 wherein said slider means includes a base positioned about the exterior of the track member and a securement member associated with said base for removably securing said base member to said track member.

4. The cargo restraint according to claim 3 wherein said base includes a means for pivotally securing said bracket to said base.

5. The cargo restraint according to claim 2 wherein said slider means includes a frame member positioned within said track member and means on said frame member for securing said frame member in position in said track member.

6. The cargo restraint according to claim 5 wherein said frame member includes a means for pivotally securing said bracket to said frame member.

7. A cargo restraint for a vehicle comprising: a pair of laterally spaced longitudinally extending track members positioned on a surface of the vehicle, a planar beam member movable between a first position generally perpendicular to said surface for restraining cargo on said surface and a retracted second position generally parallel to said surface and adjacent an upper surface of said track members, said beam member having a pair of opposite lateral edges with each edge having a first pin means, and a slider mechanism disengageably associated with at least one track member and including a bracket and a first pin means for pivotally securing said bracket to said slider mechanism, wherein said bracket includes means forming a slot extending therethrough and partially along said bracket, said second pin means being disposed within said slot and adapted for movement therealong to allow movement between said first and second positions, said slider mechanism being longitudinally movable with respect to said track member for selectively longitudinally positioning said slider mechanism and beam member therealong.

8. The cargo restraint according to claim 7 wherein said slider mechanism includes a base positioned about the exterior of the track member and a securement member associated with said base for securing said base to said track member.

9. The cargo restraint according to claim 7 wherein said slider mechanism includes a frame member positioned within said track member and means on said frame member for securing said frame member in position in said track member.

10. A cargo restraint for a vehicle comprising: a pair of longitudinally extending track members each adapted to be secured upon a substantially horizontal planar surface of a vehicle, a pair of sliders each including an elongated resilient bracket, said bracket being pinned at one end thereof to its slider and each respective slider being constrained for slidable longitudinal movement in one respective track member, said bracket having a slot extending therethrough and partially therealong, a beam member having opposite edges which define a plane, and pin means extending from each edge and extending through said slot in said bracket to connect said beam member to said brackets for enabling pivotal movement of said beam member with respect to said sliders, said beam member pivoting from a first position substantially parallel to said vehicle surface and over said sliders to a second position substantially orthogonal to said vehicle surface in which position said beam member can restrain articles disposed on said surface, wherein said pin means moves along said slot in said bracket to allow movement of said beam member toward said sliders from second to said first position.

11. The cargo restraint according to claim 10 wherein said bracket includes means for locking said beam member in said second position.

12. The cargo restraint according to claim 10 wherein said sliders include a base positioned about the exterior of the track members and a securement member associated with said base for securing said base to said track member.

13. The cargo restraint according to claim 12 wherein said base includes a means for pivotally securing said bracket to said base.

14. The cargo restraint according to claim 10 wherein said sliders include a frame member positioned within said track member and means on said frame member for securing said frame member in position in said track member.

15. The cargo restraint according to claim 14 wherein said frame member includes a means for pivotally securing said bracket to said frame member.

* * * * *